(12) United States Patent
Rajagopal et al.

(10) Patent No.: US 9,010,653 B2
(45) Date of Patent: Apr. 21, 2015

(54) ERASABLE BARCODE

(71) Applicants: Ananya Rajagopal, Dublin, OH (US); Peter Hendrik Glaubitz, Dublin, OH (US); Jacob Karl Hoylman, Columbus, OH (US); Lucienne Marie Paradis, Dublin, OH (US); Nathan Thomas Sears, Dublin, OH (US); Abhimanyu Rajiv Singhal, Dublin, OH (US); Edwin Bettinger Glaubitz, Dublin, OH (US); Arjun Kumar, Dublin, OH (US); Rahul Mal, Dublin, OH (US); David Runze Feng, Dublin, OH (US)

(72) Inventors: Ananya Rajagopal, Dublin, OH (US); Peter Hendrik Glaubitz, Dublin, OH (US); Jacob Karl Hoylman, Columbus, OH (US); Lucienne Marie Paradis, Dublin, OH (US); Nathan Thomas Sears, Dublin, OH (US); Abhimanyu Rajiv Singhal, Dublin, OH (US); Edwin Bettinger Glaubitz, Dublin, OH (US); Arjun Kumar, Dublin, OH (US); Rahul Mal, Dublin, OH (US); David Runze Feng, Dublin, OH (US)

(*) Notice: Subject to any disclaimer, the term of this patent is extended or adjusted under 35 U.S.C. 154(b) by 0 days.

(21) Appl. No.: 13/870,968

(22) Filed: Apr. 25, 2013

(65) Prior Publication Data

US 2014/0217184 A1    Aug. 7, 2014

Related U.S. Application Data

(60) Provisional application No. 61/687,911, filed on May 3, 2012.

(51) Int. Cl.

| G06F 7/00 | (2006.01) |
|---|---|
| G06F 17/00 | (2006.01) |
| G06K 7/10 | (2006.01) |
| G06K 7/14 | (2006.01) |
| G06K 19/00 | (2006.01) |
| G06K 19/06 | (2006.01) |

(52) U.S. Cl.
CPC .................... *G06K 19/06046* (2013.01)

(58) Field of Classification Search
USPC ............ 235/462.01, 454, 487, 375, 376, 494
See application file for complete search history.

(56) References Cited

U.S. PATENT DOCUMENTS

| 4,812,053 | A | * | 3/1989 | Bhattacharjee ............... 374/102 |
|---|---|---|---|---|
| 6,009,400 | A | * | 12/1999 | Blackman ..................... 705/303 |
| 6,544,925 | B1 | * | 4/2003 | Prusik et al. .................. 503/201 |
| 7,232,253 | B2 | * | 6/2007 | Isbitsky et al. ................. 368/89 |
| 7,878,410 | B2 | * | 2/2011 | Norrby et al. ................. 235/487 |
| 7,963,694 | B2 | * | 6/2011 | Leute et al. .................... 374/157 |
| 8,091,776 | B2 | * | 1/2012 | Nemet et al. .................. 235/376 |
| 8,196,821 | B2 | * | 6/2012 | Nemet et al. .................. 235/383 |
| 8,267,318 | B2 | * | 9/2012 | Yoo .............................. 235/449 |
| 8,540,156 | B2 | * | 9/2013 | Nemet et al. .................. 235/437 |
| 2002/0039447 | A1 | * | 4/2002 | Shniberg et al. ............. 382/224 |
| 2003/0047616 | A1 | * | 3/2003 | Mase et al. ................... 235/494 |
| 2003/0098357 | A1 | * | 5/2003 | Cummings et al. .......... 235/494 |
| 2005/0162274 | A1 | * | 7/2005 | Shniberg et al. ........... 340/572.1 |
| 2005/0178822 | A1 | * | 8/2005 | Siuta et al. .................... 235/379 |
| 2007/0041423 | A1 | * | 2/2007 | Nygardh et al. .............. 374/141 |
| 2008/0173712 | A1 | * | 7/2008 | Nemet et al. .................. 235/385 |
| 2008/0191027 | A1 | * | 8/2008 | Yang et al. .................... 235/491 |

(Continued)

*Primary Examiner* — Daniel Walsh

(74) *Attorney, Agent, or Firm* — Nathaniel Gordon-Clark

(57) ABSTRACT

The Erasable Barcode prevents the sale of products by invalidating the barcode. The invalidation can be based on shelf life, or improper temperature maintenance. The invalidation is also visible to humans so that the consumer knows if the exposure occurs after purchase. Activation brings liquid from the first reservoir in contact with the migration medium. The liquid progressively produces a change in color over time in the migration medium. When the liquid has crossed the migration medium, it will come in contact with the absorptive medium. The absorptive medium will then rapidly change color. The absorptive layer is the substrate for a machine readable barcode such that the color change renders the barcode unreadable.

3 Claims, 1 Drawing Sheet

(56) References Cited

U.S. PATENT DOCUMENTS

| | | | |
|---|---|---|---|
| 2008/0232427 A1* | 9/2008 | Leute et al. | 374/161 |
| 2008/0268139 A1* | 10/2008 | Chatow et al. | 427/145 |
| 2008/0269050 A1* | 10/2008 | Azizian et al. | 503/217 |
| 2008/0272886 A1* | 11/2008 | Tiller et al. | 340/10.1 |
| 2008/0290174 A1* | 11/2008 | Norrby et al. | 235/487 |
| 2009/0230182 A1* | 9/2009 | Nemet et al. | 235/375 |
| 2009/0302102 A1* | 12/2009 | Nemet et al. | 235/376 |
| 2009/0302115 A1* | 12/2009 | Dowling | 235/462.01 |
| 2009/0320742 A1* | 12/2009 | Leute et al. | 116/207 |
| 2010/0213255 A1* | 8/2010 | Yoo | 235/449 |
| 2010/0312574 A1* | 12/2010 | Yoo | 705/2 |
| 2012/0145781 A1* | 6/2012 | Nemet et al. | 235/376 |
| 2012/0305637 A1* | 12/2012 | Nemet et al. | 235/375 |
| 2012/0326878 A1* | 12/2012 | Viguie et al. | 340/584 |
| 2014/0110486 A1* | 4/2014 | Nemet | 235/494 |
| 2014/0130729 A1* | 5/2014 | Rastegar et al. | 116/201 |
| 2014/0130730 A1* | 5/2014 | Rastegar et al. | 116/216 |
| 2014/0217184 A1* | 8/2014 | Rajagopal et al. | 235/494 |

\* cited by examiner

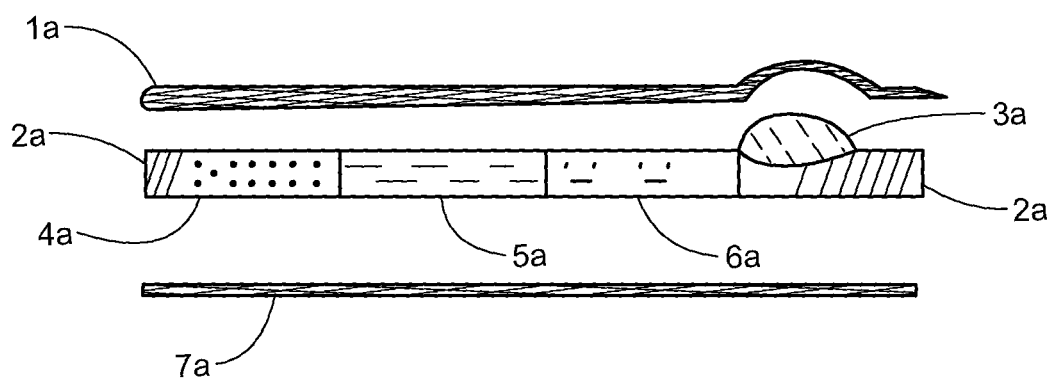

ERASABLE BARCODE

PRIORITY

This application claims the benefit of provisional application, No. 61/687,911 that was filed on May 3, 2012 by the inventors Rajagopal, et al.

BACKGROUND

There are many current solutions to indicate the expiration of the shelf life of a product. Most require humans to locate and read the date, know the current date, and decide if the shelf life has past. There are few solutions that can measure the amount of time a product is above a set point (usually around 40 F). These also require human interpretation and decision making By creating a mechanism that invalidates the barcode, the automation provided by checkout scanners are brought into the process. This removes the source of human error. This protects the consumer from potentially harmful products. The seller is also protected from law suits resulting from being the source of a product that caused harm. Since some products are packaged in the store, integrating this into a label which can be printed using a thermal printer allows protection of a larger range of products.

Shelf life (or in some cases, used by dates) are typically a printed date based on when the product was packaged. A few, such as Timestrip (U.S. Pat. No. 7,232,253), simplify the process by having an "Expired" or similar indication. The temperature monitoring versions of these exist (some also from Timestrip). But as mentioned before a human must locate and interpret these indications.

BRIEF DESCRIPTION OF THE DRAWINGS

FIG. 1 is a side view and cross section of the erasable barcode.

DETAILED DESCRIPTION

Referring to FIG. 1, a liquid, such as ink, starts in the pre-activation chamber (3a). Referring to FIG. 1, when activated it will flow into the reservoir (6a). Referring to FIG. 1, this liquid cannot leave the label because of the leak stops (2a) that are located at the edges of the label. Referring to FIG. 1, over time the liquid will advance into the controlled migration medium (5a). Referring to FIG. 1, after the length of time determined by the migration medium, the liquid will flow into the area containing the highly absorptive material (4a) and will fill in very rapidly. Referring to FIG. 1, all of the previously mentioned components are located underneath a printable surface (1a). This is the surface on to which the barcode is printed. Sufficient portions of barcode to invalidate it must be over a region through which the absorptive medium is visible. Other sections may be visible as well. The label will optionally have an adhesive backing (7a).

The liquid is stored in the pre-activation chamber (3a) until it is read for use. The invention is activated when the liquid is released from the pre-activation chamber (3a) and flows into the reservoir (6a). This release can happened many ways. The preferred embodiment envisions the pre-activation chamber (3a) releasing the liquid in response to pressure, such as the use of pressure to break a barrier that allows the liquid to flow out of the pre-activation chamber (3a). In applications such as items sold by individual weight where a label is likely to be applied thermal printers are common. In this application pressure of the print head should be sufficient to automatically activate the label.

The printable surface (1a) will have at least a bar code printed on the printable surface (1a). Optionally, the printable surface (1a) may also have words, symbols or phrases. The printable surface (1a) is sufficiently transparent that when the liquid enters the absorptive material (5a) that is proximal to the printable surface (1a), the color of the liquid will obscure or render unreadable the bar code. Optionally, the words, symbols, or phrases may be also rendered unreadable.

The liquid is a colored substance that will render the barcode on the printable surface (1a) unreadable when the liquid reaches the absorptive material (5a). The preferred embodiment envisions a liquid that does not react, change, or modify during the operating of the invention so that a food or medicine safe liquid can be placed in the reservoir (6a) and remain food or medicine safe during the operation of the invention. The preferred embodiment envisions the liquid as ink, dye or other colored fluid. The liquid can be any color that will render the barcode on the printable surface (1a) unreadable.

Some products are affected by temperature over time. In these situations a combination of liquid and migration medium (5a) would be tailored to the behavior over temperature that is desired. In the case of a product that will require refrigeration, a combination that would only allow migration when over 40 F could be chosen. For frozen products the temperature point would be lower than 32 F.

The invention requires that the printable surface (1a) be located near or proximal to the absorptive material (4a). Once the absorptive material (4a) absorbs the liquid from the reservoir (6a), the absorptive material (4a) changes color to a color that will obscure the barcode on the printable surface (1a). In the preferred version, the color of the printable surface (1a) and the color of the absorptive material (4a) after the absorption of the liquid are identical or substantially identical.

Placing the reservoir (6a) in close proximity to the absorptive material (4a) allows for construction of dynamic wording to reinforce the reason the product is no longer sell able. For example, if the word "SAFE" was written above the initial reservoir (6a) and the absorptive region was to the left, then its color change could revealed the word "UN". When the product is sellable and the device is active it will read "SAFE". Once the barcode becomes invalidated it will read "UNSAFE". Depending on the application this wording is flexible. Any word accepting "UN", "IM", or similar negative prefixes can be used. If the color change is selected to hide the printing (as with the barcode) positive prefixes can be hidden. This additionally protects the consumer by indicating an unusable condition created after purchase.

An example of a use of the thermally sensitive version of this is for meat products in the grocery store. The Erasable Barcode, prevents the sale of meat stored at improper temperatures, and lets the consumer also know the result of the exposure after the food has left the grocery store. When the Erasable Barcode is activated, the word "SAFE" appears. As the package is exposed to temperatures over 40 F, the liquid migrates closer to the barcode. After two hours of exposure, the liquid will migrate into the absorptive medium. The color change in this medium prevents the barcode from being able to be scanned. When this happens, the prefix "UN" will appear next to the word "SAFE", making it "UNSAFE". This works at home too, because if the meat has been stored at improper temperatures at home, the word "UNSAFE" will still appear, so the consumer will know. For packages of meat produced at a central location, the protection begins at the point of production. This allows the store to verify the meat was properly handled prior to arriving at the store.

Since most dairy products are produced centrally, applying the implementation above to dairy products covers more of the supply chain than just the store.

The Erasable Barcode also can help doctors and pharmacists in hospitals and other clinics where many patients get treated. This includes giving them medicine and injections to treat diseases. Many of these locations use barcodes to track medical supplies for both billing and inventory purposes. However, these medicines can also go bad, this can cause the patients to become sicker and even the disease to get stronger. For example, if liquid medicines go past their expiry date, the formulation is no longer as expected which can cause reactions that make the patient very ill. If the expiration date is based on diminished efficacy, the disease exposed to the weakened treatment could potentially become immune it. (In much the same way some of our inoculations work) If our solution is implemented into the medical system, then many of the previously mentioned risks can be avoided.

Another possible medical use in tracking blood from a blood bank. The blood has both a limited overall useful span (typically 21 to 35 days depending on treatment process) and temperature storage requirements. By having both a temperature sensitive and duration only device a violation of either constraint results in the container being rendered unscanable and therefore unusable.

The Erasable Barcode can also help beauty specialists tell when their beauty products go bad. If these products go bad and a customer uses the expired products, the consumer could develop rashes or allergies to these products. As a result, the consumer or their families may end up suing the company for thousands of dollars. If the Erasable Barcode is implemented onto this system, then the companies will know if their products have gotten bad and the consumer can tell if a beauty product has gone bad in their homes.

Chemicals such as paints and pesticides frequently have shelf lives based on their formulations. Integrating the tracking of this expiration and the barcode used to make the purchase prevents products that may not behave in the way they were intended from impacting the environment.

The liquid in the reservoir (6a) can be any colored liquid. The liquid can have any opacity or viscosity. The preferred embodiment envisions the use of ink as the liquid, but any colored liquid, such as paint or dye may be used. The preferred embodiment envisions a liquid with low viscosity and high opacity.

The biggest difference with the Erasable Barcode and other products on the market, is that not only will the Erasable Barcode notify the consumer if the product had been improperly stored prior to purchase, but it will also prevent the sale of improperly stored or old products. It also continues to let consumers know if the product has been improperly stored after sale. Since this solution is part of the label for the barcode, there is no chance that this important informational tool is left off the product.

Although this invention has been illustrated by reference to specific embodiments, it will be apparent to those skilled in the art that various changes and modification may be made which clearly fall within the scope of the invention. The invention is intended to be protected broadly within the spirit and scope of the appended claims.

What is claimed is:

1. An erasable barcode comprising:
a reservoir;
an ink of a color;
an amount of the ink held in a pre-activation chamber;
a barrier between the reservoir and the pre-activation chamber;
a rate controlled migration medium;
an absorptive medium;
a transparent printable surface;
a single machine readable barcode on the printable surface and proximal to the absorptive medium that is printed in a color similar to the color of ink;
upon activation of the erasable barcode by removal of the barrier between the pre-activation chamber and the reservoir, the ink in the pre-activation chamber flows into the reservoir and across the reservoir to the migration medium, wherein the ink migrates across the migration medium to the absorptive medium wherein changing the color of the absorptive medium resulting in obscuring of the machine readable barcode and rendering the machine readable barcode unreadable.

2. The erasable barcode according to claim 1 where the printable surface is translucent.

3. The erasable barcode according to claim 1 where the printable surface contains a first message placed proximal to the machine readable barcode so that when the ink enters the absorptive medium, a second message is reveals that negates the meaning of the first message.

* * * * *